US012812546B2

(12) United States Patent
Singh

(10) Patent No.: US 12,812,546 B2
(45) Date of Patent: Nov. 24, 2026

(54) SYSTEMS AND METHODS FOR MANAGING BANDWIDTH WHILE CONSERVING BATTERY LIFE

(71) Applicant: T-Mobile Innovations LLC, Overland Park, KS (US)

(72) Inventor: Jasinder P. Singh, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 291 days.

(21) Appl. No.: 18/544,971

(22) Filed: Dec. 19, 2023

(65) Prior Publication Data

US 2025/0203523 A1 Jun. 19, 2025

(51) Int. Cl.

| | |
|---|---|
| ***H04W 52/02*** | (2009.01) |
| ***H04W 72/04*** | (2023.01) |
| ***H04W 72/0453*** | (2023.01) |
| ***H04W 72/51*** | (2023.01) |

(52) U.S. Cl.

CPC ....... *H04W 52/0261* (2013.01); *H04W 72/04* (2013.01); *H04W 72/0453* (2013.01); *H04W 72/51* (2023.01)

(58) Field of Classification Search

CPC . H04W 52/0261; H04W 72/04; H04W 72/51; H04W 72/0453

See application file for complete search history.

(56) References Cited

U.S. PATENT DOCUMENTS

| | | | | |
|---|---|---|---|---|
| 11,664,942 | B2 | 5/2023 | Chou et al. | |
| 11,690,081 | B2 | 6/2023 | Takeda et al. | |
| 2012/0054304 | A1* | 3/2012 | Pica | H04W 24/08<br>709/217 |
| 2015/0296455 | A1* | 10/2015 | Yamazaki | H04W 76/27<br>370/311 |
| 2019/0281504 | A1* | 9/2019 | Su | H04W 76/28 |
| 2020/0037248 | A1* | 1/2020 | Zhou | H04L 5/0032 |
| 2021/0195439 | A1* | 6/2021 | Prabhakar | H04B 17/17 |
| 2022/0201676 | A1* | 6/2022 | Kumar | H04W 76/27 |
| 2022/0240284 | A1* | 7/2022 | Zhou | H04W 52/0225 |
| 2022/0312429 | A1* | 9/2022 | Hande | H04W 72/23 |
| 2022/0361110 | A1* | 11/2022 | Lee | H04B 7/0413 |
| 2023/0209315 | A1* | 6/2023 | Shrivastava | H04W 4/06<br>370/329 |
| 2023/0362820 | A1* | 11/2023 | Elshafie | H04L 5/001 |
| 2024/0430868 | A1* | 12/2024 | Abotabl | H04W 72/0453 |

* cited by examiner

*Primary Examiner* — Shah M Rahman

(74) *Attorney, Agent, or Firm* — Jones Burke, PLLC

(57) ABSTRACT

Systems and methods are provided for managing bandwidth while conserving battery in a wireless network. The methods include manipulating BWPs for the PCell and the one or more SCells based on the remaining battery life of the wireless device. With high remaining battery life, BWP sizes do not need to be restricted. With lower remaining battery life, the BWP sizes are restricted in an incremental way depending on the remaining battery life.

19 Claims, 5 Drawing Sheets

SYSTEMS AND METHODS FOR MANAGING BANDWIDTH WHILE CONSERVING BATTERY LIFE

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)). RATS may additionally include, for example, Wi-Fi and Bluetooth. Additionally, different standards may be implemented, including one or more International Engineering Task Force (IETF) standards; one or more of the Institute of Electrical and Electronics Engineers (IEEE) 802.11 standards; and/or any other industry standards and/or specifications. Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages. For example, 5G networks provide edge deployments enabling computing capabilities closer to UEs.

A carrier may be configured to for each of the different RATs and it may be configured for different frequency ranges. For example, the 5G spectrum may be divided into high, medium, and low frequency bands. Modern mobile devices are capable of interacting with multiple carriers. Carrier aggregation is a common method of improving performance for wireless users by allowing the mobile device to utilize multiple carriers at the same time, thus increasing the amount of data that can be transmitted at the same time. With so many mobile devices all trying to use all available carriers at the same time, it is possible to overload the provider's network and steps need to be taken to gracefully handle the high loads. With mobile devices using multiple carriers, power usage increases and thus battery run time decreases. There is a need for balancing the higher bandwidth requirements with conserving battery life for mobile devices.

OVERVIEW

Examples described herein include systems and methods for managing bandwidth allocation in a wireless network. An exemplary method includes receiving a measurement report from a wireless device, wherein the measurement report includes a remaining battery life of the wireless device. The method further includes upon determining that the remaining battery life is at or above a first threshold, assigning a full Bandwidth Part (BWP) for a Primary Cell (PCell) and one or more Secondary Cells (SCells). The method may further include upon determining that the remaining battery life is at or above a second threshold and below the first threshold, assigning the full BWP for the PCell and a lowest supported BWP for the one or more SCells. The method may further include upon determining that the remaining battery life is at or above a third threshold and below the second threshold, assigning an intermediate BWP for the PCell and the one or more SCells. The method may further include upon determining that the remaining battery life is below the third threshold, assigning a lowest supported BWP for the PCell.

Another exemplary embodiment includes a system including an access node which includes at least one electronic processor configured to perform operations. The operations include receiving a measurement report from a wireless device, wherein the measurement report includes a remaining battery life for the wireless device. The operations further include upon determining that the remaining battery life is at or above a first threshold, assigning a full Bandwidth Part (BWP) for a Primary Cell (PCell) and one or more Secondary Cells (SCells). The operations may further include upon determining that the remaining battery life is at or above a second threshold and below the first threshold, assigning the full BWP for the PCell and a lowest supported BWP for the one or more SCells. The operations may further include upon determining that the remaining battery life is at or above a third threshold and below the second threshold, assigning an intermediate BWP for the PCell and the one or more SCells. The operations may further include upon determining that the remaining battery life is below the third threshold, assigning a lowest supported BWP for the PCell.

Another exemplary method includes monitoring a remaining battery life of a wireless device. The method further includes assigning a full Bandwidth Part (BWP) to a primary cell (PCell) and one or more secondary cells (SCells) while the remaining battery life remains at or above a first threshold. The method further includes assigning the full BWP to the PCell and a smallest supported BWP to the one or more SCells while the remaining battery life remains below the first threshold and at or above a second threshold. The method further includes assigning an intermediate BWP for the PCell and the one or more SCells while the remaining battery life remains below the second threshold and at or above the third threshold. The method further includes assigning the smallest supported BWP to the PCell while the remaining battery life remains below the third threshold.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
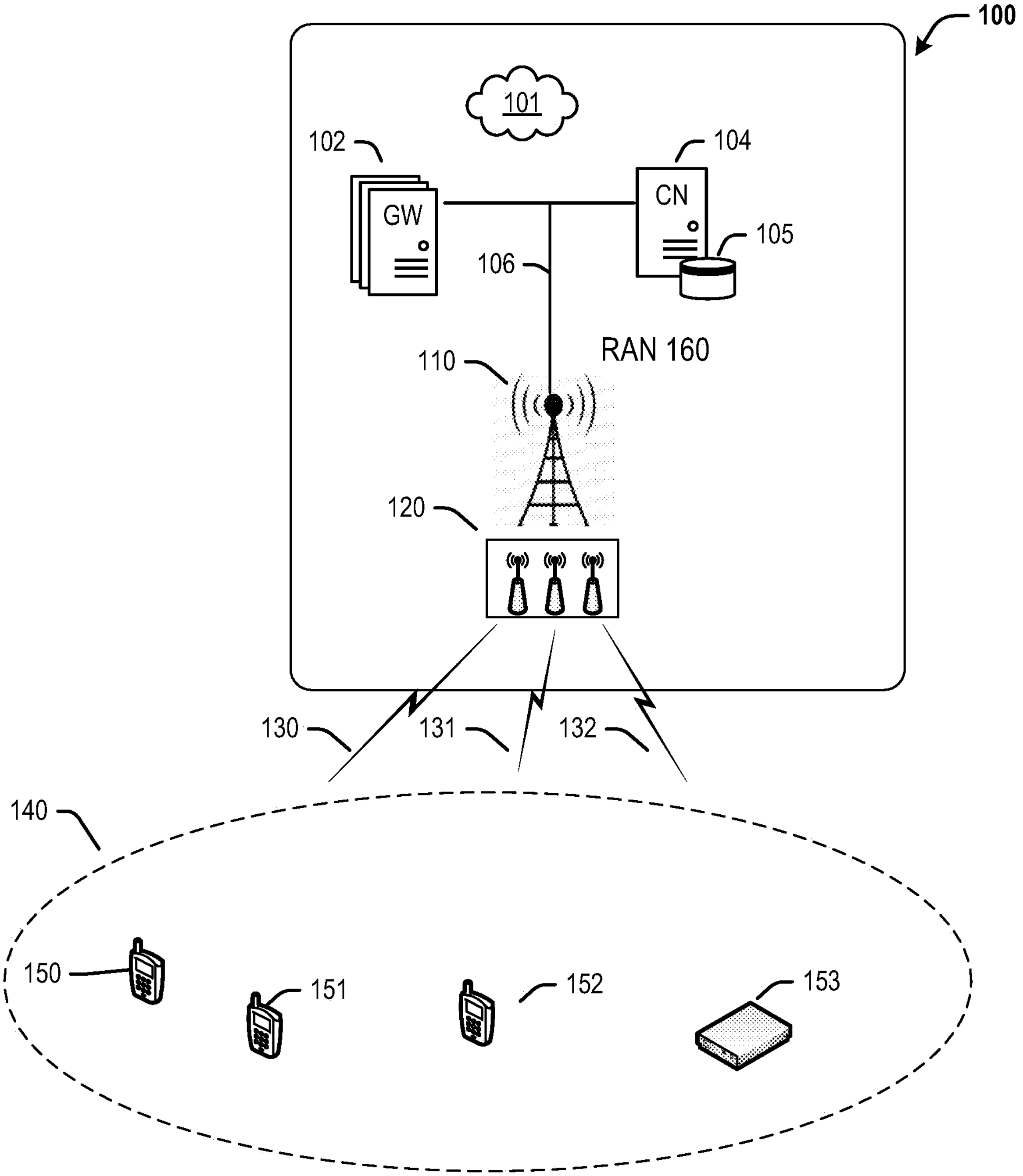
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a wireless network may be provided by an access node. Access nodes provide several frequency bands for providing service. Lower frequency bands give higher coverage areas, but lower data throughput. Higher frequency bands give smaller coverage areas, but higher data throughput. These frequency bands can be referred to as carriers. For example, an access node may provide a carrier with a low frequency band and a carrier with a high frequency band. Modern wireless devices have the ability to access multiple carriers at a time. By aggregating these different carriers, a more robust service may be provided to the users of the wireless network. For example, by accessing multiple carriers, a wireless device would have access to the data throughput of the sum of the throughput offered by the carriers the wireless device is connected to.

In carrier aggregation (CA), each carrier is called a component carrier (CC). There is always one primary component carrier (PCC), and any remaining carriers are secondary component carriers (SCC). The PCC is serviced by the primary cell (PCell), and the one or more SCCs are serviced by a corresponding number of secondary cells (SCell). All uplink data, including control signaling, is sent on the PCC, while all other traffic, including downlink data, is sent on the one or more SCCs. That means the Physical Uplink Control Channel (PUCCH) is always on the PCC.

In Release 15, the 3GPP specified some new features for 5G, including Bandwidth Parts (BWP). Before BWP, a wireless device using a carrier, would use the full bandwidth of the carrier whenever it was transmitting via that carrier. This is not bandwidth efficient and since it takes more power to transmit the full bandwidth, it is wasteful of power as well. Wireless devices tend to run on battery power and that battery life is precious and should not be wasted. With BWP, the full bandwidth of a carrier can be broken into as many as 4 separate BWPs. Each BWP can range in size from the full bandwidth to a smallest supported size, which may vary based on the configuration of the carrier and BWP. Each BWP can have its own configuration and allows for a much more efficient use of bandwidth and of power. This can help preserve the battery life of wireless devices. Additionally, BWP can help support legacy devices that might not support the new bandwidths introduced with 5G. For example, a BWP may be setup that is configured to support legacy 4G devices. The 4G devices can be serviced and the remainder of the carrier is available to service other wireless devices as well. Part of the efficiency improvement of BWP is that a wireless device may be configured to use only as much bandwidth as necessary instead of using the whole bandwidth of the carrier. This flexibility allows the device to use higher bandwidth BWPs as the data requirements increase. By managing BWP more closely, user experience can be improved while conserving battery life.

Wireless devices send a measurement report to the wireless network very frequently, often every few milliseconds. The measurement report contains many different details about the current state of the wireless device. By adding the remaining battery life to the measurement report, it can be easily monitored. However, since remaining battery life is relatively slow to change, it would not need to be included in every measurement report. Remaining battery life could be included periodically in the measurement report. It could be included in every few instances of the measurement report, every 10 instances, for example. Alternatively, the period could be based on time such as every second, for example. The period, whether time-based or instance-based, may be fully configurable and could be set to any useable value. The value may be predetermined by the wireless provider or may be set at any point, including by the user of the wireless device as a setting on the wireless device itself.

The access node may receive the remaining battery life of a wireless device via the measurement report and may then manage the BWP for that device based on the remaining battery life to manage bandwidth in a more granular way while conserving battery life. Different thresholds of remaining battery life may be set at which the BWP settings can be configured differently. If the remaining battery life is at or above a first threshold, 70% of maximum battery capacity for example, there is no need to limit bandwidth and the full BWP may be available for the PCell and all configured SCells. If the remaining battery life is at or above a second threshold and below the first threshold, the BWP may be managed to reduce power consumption. For example, if the remaining battery life is between 50% and 70% of maximum battery capacity, the full BWP may be used for the PCell and the lowest supported BWP size may be used for the SCells. If the remaining battery life is at or above a third threshold and below the second threshold, BWP may be further restricted. For example, if the remaining battery life is between 30% and 50% of maximum battery capacity, BWP may be set to an intermediate value for the PCell and the SCells. This intermediate value may be any value between the full BWP and the lowest supported BWP, for example it could be set to halfway between the full BWP and the lowest supported BWP. If the remaining battery life is below the third threshold, BWP can be further restricted as battery life needs to be preserved even more. For example, if the remaining battery life is below 30% of maximum battery capacity, BWP may be set to the lowest supported size for the PCell and the SCells. The specific percentages of maximum battery capacity given above are merely examples. Any useable values may be used provided the first threshold is higher than the second threshold which is higher than the third threshold. The remaining battery life may be continuously monitored and the BWP may be modified as the remaining battery life decreases while the wireless device is used or increases while the wireless device is recharged.

FIG. 1 depicts an exemplary system 100 for managing bandwidth while conserving battery in a wireless network. System 100 includes a communication network 101, gateway node(s) 102, controller node 104, access node 110, and wireless devices 150-153. Access node 110 can be any network node configured to provide communication between wireless devices 150-153 and communication network 101, including standard access nodes and/or short range, low power, small access nodes.

For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB, home eNodeB or home gNodeB device. By virtue of comprising a plurality of antennae 120 as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. While three antennae are shown in the array 120, any number of antennae may be included in the array 120. Moreover, each of wireless devices 150-153 can also be equipped with a plurality of antennae enabling these different types of transmissions.

For example, each of wireless devices 150-153 may be capable of simultaneously communicating with access node 110 using combinations of antennae via 4G and 5G or any other RAT or transmission mode, including multiple carriers. For instance, MU-MIMO pairings and SU-MIMO pairings can be made by wireless devices 150-153. It is noted that any number of access nodes, antennae, MU-MIMO pools, carriers, and wireless devices can be implemented.

Wireless devices 150-153 may be any device, system, combination of devices, or other such communication platform capable of communicating on the wireless network using one or more frequency bands deployed therefrom. Each wireless device 150-153 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via the wireless network. Other types of communication platforms are possible. Communication channels 130-132 may be configured as component carriers with carrier 130 being the primary carrier and carriers 131-132 being secondary carriers. Three carriers are shown for clarity, but any number of carriers may be used.

In operation, access node 110 may be configured to execute a method including receiving a measurement report from a wireless device 150-153, wherein the measurement report includes a remaining battery life of the wireless device 150-153. The method may further include upon determining that the remaining battery life is at or above a first threshold, assigning a full Bandwidth Part (BWP) for a Primary Cell (PCell) and one or more Secondary Cells (SCells). The method may further include upon determining that the remaining battery life is at or above a second threshold and below the first threshold, assigning the full BWP for the PCell and a lowest supported BWP for the one or more SCells. The method may further include upon determining that the remaining battery life is at or above a third threshold and below the second threshold, assigning an intermediate BWP for the PCell and the one or more SCells. The method may further include upon determining that the remaining battery life is below the third threshold, assigning a lowest supported BWP for the PCell.

Remaining battery life could be included periodically in the measurement report. It could be included in every few instances of the measurement report, every 10 instances, for example. Alternatively, the period could be based on time such as every minute, for example. The period, whether time-based or instance-based, may be fully configurable and could be set to any useable value. The value may be predetermined by the wireless provider or device manufacturer, for example, or may be set at any point, including by the user of the wireless device as a setting on the wireless device itself.

The intermediate value may be any value between the full BWP and the lowest supported BWP, for example it could be set to halfway between the full BWP and the lowest supported BWP. The first threshold could be set to 70% of maximum battery capacity, for example. The second threshold could be set to 50% of maximum battery capacity, for example. The third threshold could be set to 30% of maximum battery capacity, for example. The specific percentages of maximum battery capacity given above are merely examples. Any useable values may be used provided the first threshold is higher than the second threshold which is higher than the third threshold.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown) using a direct link such as an X2 link or similar.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150-153, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path-including combinations thereof. Communication link 106 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications link 106 may include S1 communications links. Other wireless protocols can also be used. Communication link 106 can be a direct link or might include various equipment, intermediate components, systems, and networks. Communication link 106 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), a user plane function (UPF), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing correlations of transmission types with antenna configurations, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
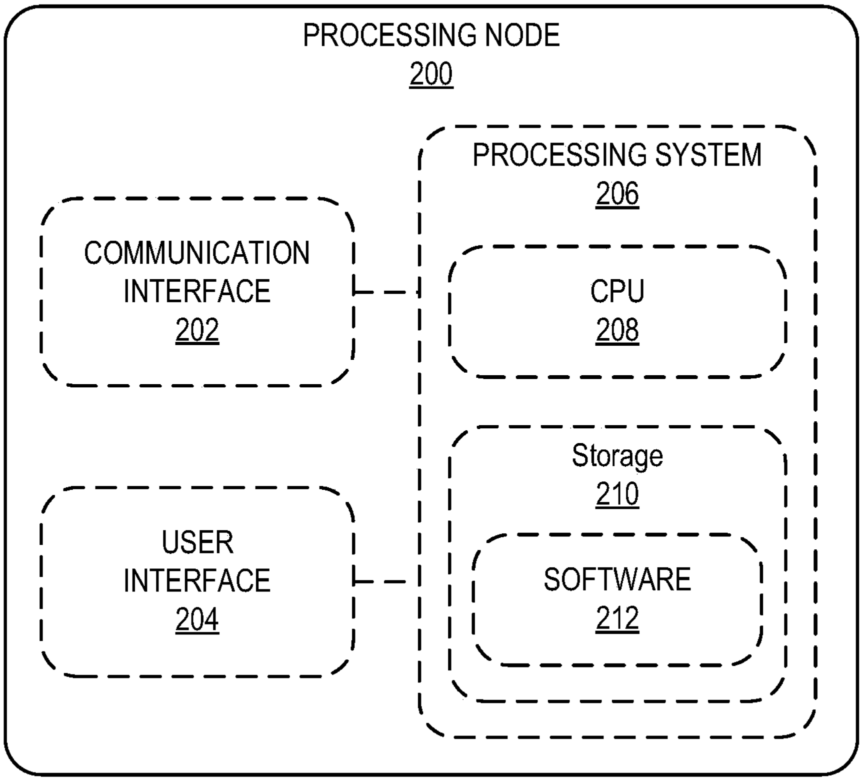
FIG. 2 illustrates an exemplary processing node in accordance with various aspects of the present disclosure.

FIG. 2 depicts an exemplary processing node 200 for managing bandwidth while conserving battery in a wireless network. The processing node 200 includes a communication interface 202, user interface 204, and processing system 206 in communication with communication interface 202 and user interface 204. Processing system 206 includes a processor 208, storage 210, which can comprise a disk drive, flash drive, memory circuitry, or other memory device including, for example, a buffer. Storage 210 can store software 212 which is used in the operation of the processing node 200. Software 212 may include computer programs, firmware, or some other form of machine-readable instructions, including an operating system, utilities, drivers, network interfaces, applications, or some other type of software. Processing system 206 may include a microprocessor 208 and other circuitry to retrieve and execute software 212 from storage 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for receiving a measurement report from a wireless device, wherein the measurement report includes a remaining battery life for the wireless device. The instructions may further include upon determining that the remaining battery life is at or above a first threshold, assigning a full Bandwidth Part (BWP) for a Primary Cell (PCell) and one or more Secondary Cells (SCells). The instructions may further include upon determining that the remaining battery life is at or above a second threshold and below the first threshold, assigning the full BWP for the PCell and a lowest supported BWP for the one or more SCells. The instructions may further include upon determining that the remaining battery life is at or above a third threshold and below the second threshold, assigning an intermediate BWP for the PCell and the one or more SCells. The instructions may further include upon determining that the remaining battery life is below the third threshold, assigning a lowest supported BWP for the PCell.

Remaining battery life could be included periodically in the measurement report. It could be included in every few instances of the measurement report, every 10 instances, for example. Alternatively, the period could be based on time such as every minute, for example. The period, whether time-based or instance-based, may be fully configurable and could be set to any useable value. The value may be predetermined by the wireless provider or device manufacturer, for example, or may be set at any point, including by the user of the wireless device as a setting on the wireless device itself.

The intermediate BWP value may be any value between the full BWP and the lowest supported BWP, for example it could be set to halfway between the full BWP and the lowest supported BWP. The first threshold could be set to 70% of maximum battery capacity, for example. The second threshold could be set to 50% of maximum battery capacity, for example. The third threshold could be set to 30% of maximum battery capacity, for example. The specific percentages of maximum battery capacity given above are merely examples. Any useable values may be used provided the first threshold is higher than the second threshold which is higher than the third threshold.

Figure 3:
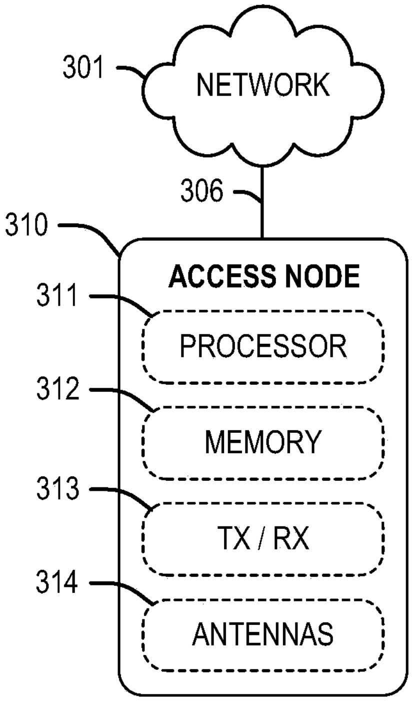
FIG. 3 illustrates an exemplary access node in accordance with various aspects of the present disclosure.

FIG. 3 depicts an exemplary access node 310 for providing wireless service in wireless networks. Access node 310 is configured as an access point for providing network services from network 301 to end-user wireless devices such as wireless devices 150-153 in FIG. 1. Access node 310 is illustrated as comprising a processor 311, a memory 312 for storing logical modules that perform operations described herein, and one or more transceivers 313 for transmitting and receiving signals via antennae 314. Combination of antennae 314 and transceivers 313 are configured to deploy one or more radio air interfaces using different RATs, frequencies, and/or operating modes. Additional transceivers and antennae may be incorporated in order to deploy 4G, 5G, mm-wave, SU-MIMO, MU-MIMO or massive MU-MIMO data streams to wireless devices attached to access node 310, as well as to facilitate communication with other network nodes on network 301. Further, access node 310 is communicatively coupled to network 301 via communication interface 306, which may be any wired or wireless link as described above. The one or more antennae 314 can include any combination of: antennae associated with different radio access technologies (RATs) (including 3G, 4G, 5G, 5G sub 6G, 5G millimeter wave), antennae associated with different arrays (including 2×2, 4×2, 4×4, 8×8, 16×16, 32×32, 64×64, 128×128, and so on), and beamforming antennae.

Figure 4:
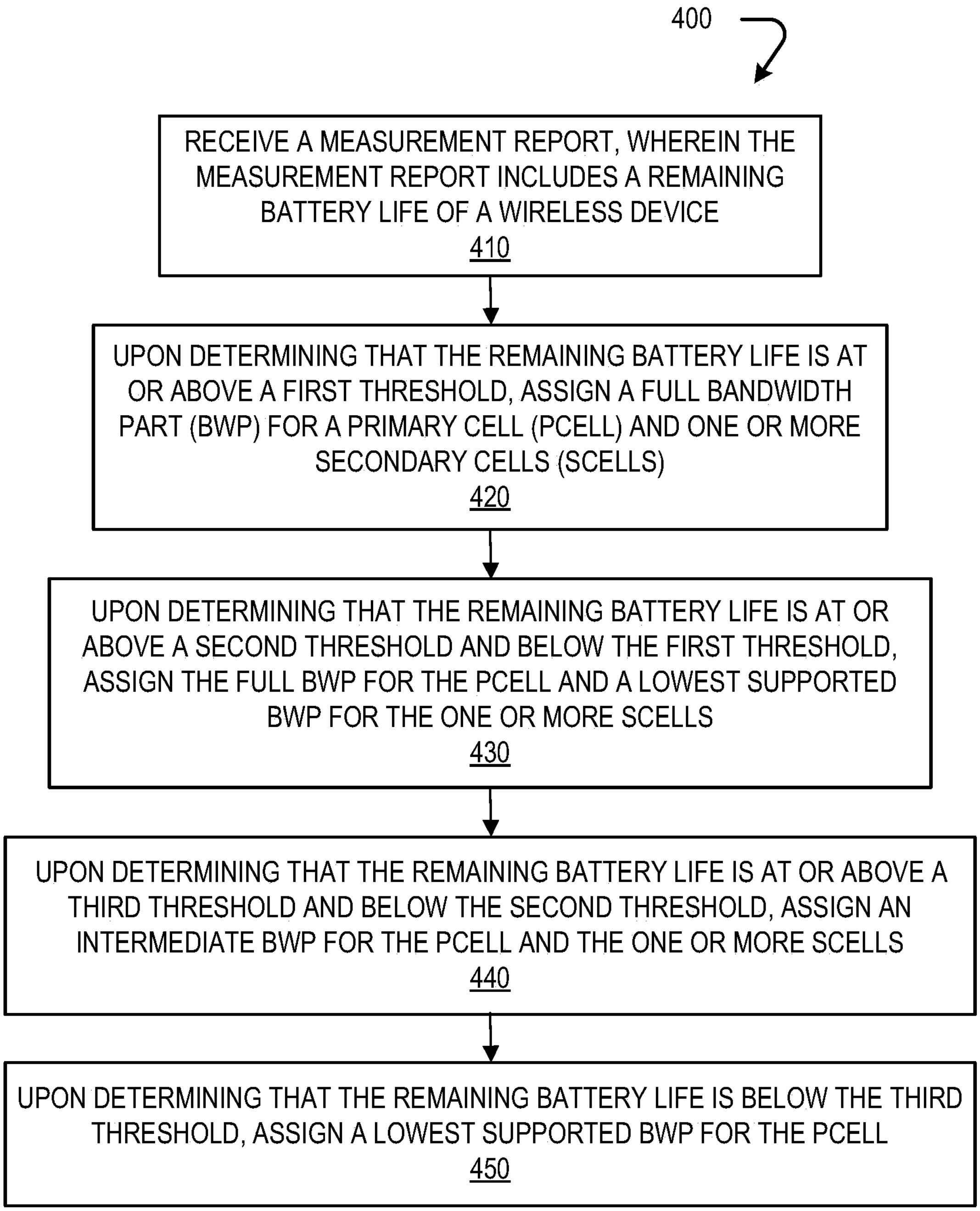
FIG. 4 illustrates an exemplary process flow for managing bandwidth while conserving battery in a wireless network.
Figure 5:
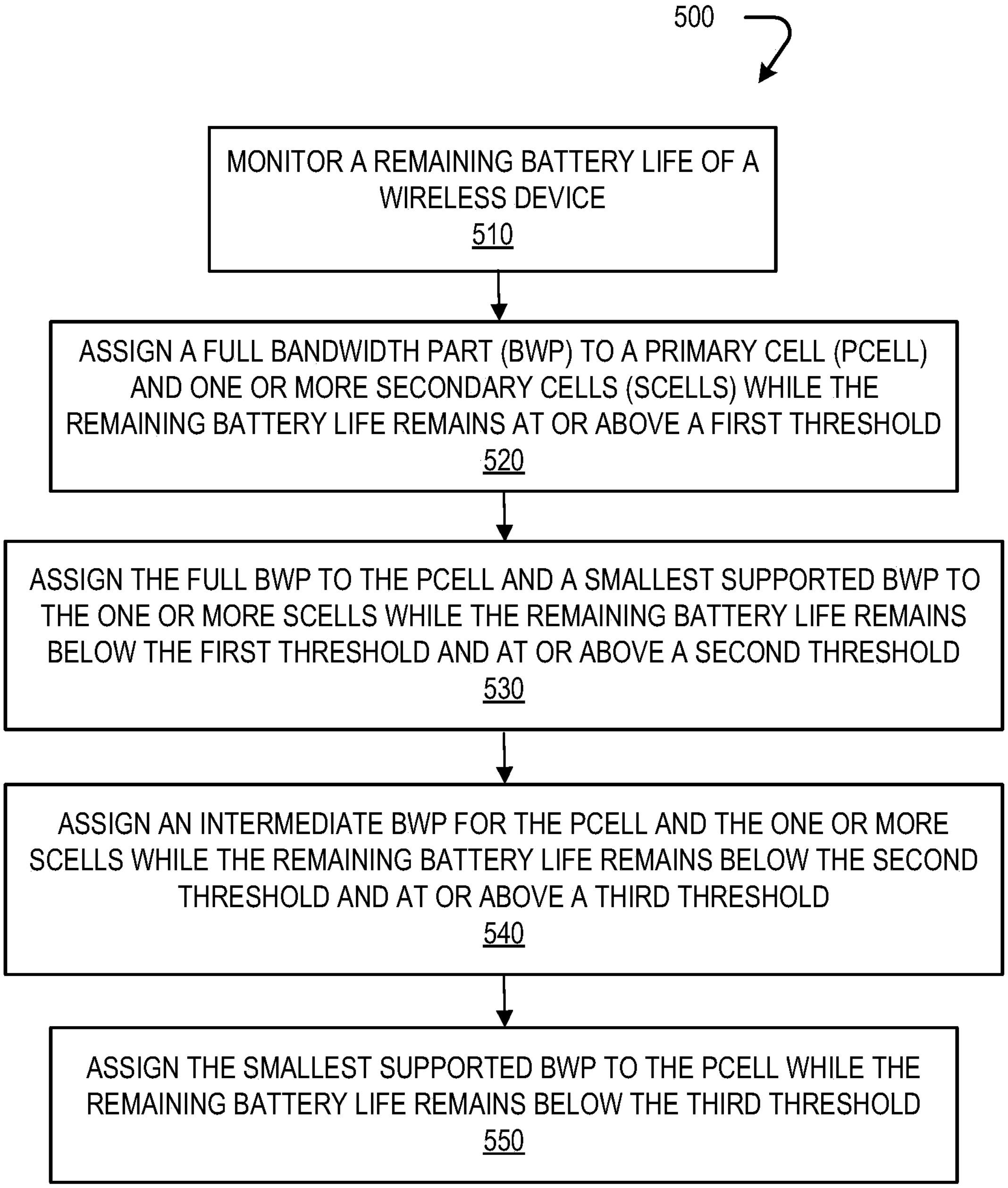
FIG. 5 illustrates an exemplary process flow for managing bandwidth while conserving battery in a wireless network.

Access node 310 may be configured to perform the methods described herein including the methods described with respect to FIG. 4 and FIG. 5. The processor 311 of access node 310 may be configured to perform the instructions described herein including those described with respect to the processing node 200 of FIG. 2.

FIG. 4 illustrates an exemplary method 400 for managing bandwidth while conserving battery in a wireless network. Method 400 may be performed by any suitable combination of processors, for example a processor contained in an access node such as access node 110, 310. In other embodiments, the method can be implemented with any suitable network element, such as processing node 200. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 400 begins in step 410 where a measurement report is received from a wireless device. The measurement report includes a remaining battery life for the wireless device. Method 400 continues in step 420 where upon determining that the remaining battery life is at or above a first threshold, assigning a full Bandwidth Part (BWP) for a Primary Cell (PCell) and one or more Secondary Cells (SCells). Method 400 may continue in step 430 where upon determining that the remaining battery life is at or above a second threshold and below the first threshold, assigning the full BWP for the PCell and a lowest supported BWP for the one or more SCells. Method 400 may continue in step 440 where upon determining that the remaining battery life is at or above a third threshold and below the second threshold, assigning an intermediate BWP for the PCell and the one or more SCells. Method 400 may continue in step 450 where upon determining that the remaining battery life is below the third threshold, assigning a lowest supported BWP for the PCell.

Remaining battery life could be included periodically in the measurement report. It could be included in every few instances of the measurement report, every 10 instances, for example. Alternatively, the period could be based on time such as every minute, for example. The period, whether time-based or instance-based, may be fully configurable and could be set to any useable value. The value may be predetermined by the wireless provider or device manufacturer, for example, or may be set at any point, including by the user of the wireless device as a setting on the wireless device itself.

The intermediate BWP value may be any value between the full BWP and the lowest supported BWP, for example it could be set to halfway between the full BWP and the lowest supported BWP. The first threshold could be set to 70% of maximum battery capacity, for example. The second threshold could be set to 50% of maximum battery capacity, for example. The third threshold could be set to 30% of maximum battery capacity, for example. The specific percentages of maximum battery capacity given above are merely examples. Any useable values may be used provided the first threshold is higher than the second threshold which is higher than the third threshold.

FIG. 5 illustrates an exemplary method 500 for managing bandwidth while conserving battery in a wireless network. Method 500 may be performed by any suitable combination of processors, for example a processor contained in an access node such as access node 110, 310. In other embodiments, the method can be implemented with any suitable network element, such as processing node 200. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 500 begins in step 510 where a remaining battery life of a wireless device is monitored. The remaining battery life may be monitored by querying a measurement report from the wireless device. The measurement report may be configured to periodically include the remaining battery life. The period may be instance-based where not every instance of the measurement report includes the remaining battery life, but rather every 10th instance, for example, includes the remaining battery life. The period may be time-based where the measurement report coinciding with a specific time interval includes the remaining battery life, every 1 second, for example. Method 500 continues in step 520 where a full Bandwidth Part (BWP) is assigned to a Primary Cell (PCell) and one or more Secondary Cells (SCells) while the remaining battery life remains at or above a first threshold. Method 500 continues in step 530 where the full BWP is assigned for the PCell and a smallest supported BWP is assigned to the one or more SCells while the remaining battery life remains below the first threshold and at or above a second threshold. Method 500 continues in step 540 where an intermediate BWP is assigned for the PCell and the one or more SCells while the remaining battery life remains below the second threshold and at or above the third threshold. Method 500 continues in step 550 where the smallest supported BWP is assigned to the PCell while the remaining battery life remains below the third threshold.

The intermediate BWP value may be any value between the full BWP and the lowest supported BWP, for example it could be set to halfway between the full BWP and the lowest supported BWP. The first threshold could be set to 70% of maximum battery capacity, for example. The second threshold could be set to 50% of maximum battery capacity, for example. The third threshold could be set to 30% of maximum battery capacity, for example. The specific percentages of maximum battery capacity given above are merely examples. Any useable values may be used provided the first threshold is higher than the second threshold which is higher than the third threshold.

In some embodiments, methods 400 and 500 may include additional steps or operations. Furthermore, the methods may include steps shown in each of the other methods. As one of ordinary skill in the art would understand, the methods of 400 and 500 may be integrated in any useful manner and the steps may be performed in any useful sequence.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing bandwidth allocation during carrier aggregation, the method comprising:

receiving a measurement report from a wireless device, wherein the measurement report includes a remaining battery life of the wireless device; and upon determining that the remaining battery life is at or above a first threshold, assigning a full Bandwidth Part (BWP) for a Primary Cell (PCell) and one or more Secondary Cells (SCells);

upon determining that the remaining battery life is at or above a second threshold and below the first threshold, assigning the full BWP for the PCell and a lowest supported BWP for the one or more SCells; and upon determining that the remaining battery life is at or above a third threshold and below the second threshold, assigning an intermediate BWP for the PCell and the one or more SCells, wherein the intermediate BWP is between the full BWP and the lowest supported BWP.

2. The method of claim 1, further comprising:

upon determining that the remaining battery life is below the third threshold, assigning a lowest supported BWP for the PCell.

3. The method of claim 1, wherein the first threshold is 70% of a maximum capacity of a battery of the wireless device.

4. The method of claim 1, wherein the third threshold is 30% of a maximum capacity of a battery of the wireless device.

5. The method of claim 1 wherein the intermediate BWP is 50% between the full BWP and the lowest supported BWP.

6. The method of claim 1, further comprising assigning the smallest supported BWP to the PCell while the remaining battery life remains below the third threshold.

7. A system, the system comprising:

an access node including at least one electronic processor configured to perform operations, the operations comprising:

receiving a measurement report from a wireless device, wherein the measurement report includes a remaining battery life for the wireless device; and upon determining that the remaining battery life is at or above a first threshold, assigning a full Bandwidth Part (BWP) for a Primary Cell (PCell) and one or more Secondary Cells (SCells);

upon determining that the remaining battery life is at or above a second threshold and below the first threshold, assigning the full BWP for the PCell and a lowest supported BWP for the one or more SCells; and upon determining that the remaining battery life is at or above a third threshold and below the second threshold, assigning an intermediate BWP for the PCell and the one or more SCells wherein the intermediate BWP is between the full BWP and the lowest supported BWP.

8. The system of claim 7, the operations further comprising:

upon determining that the remaining battery life is below the third threshold, assigning a lowest supported BWP for the PCell.

9. The system of claim 7, wherein the intermediate BWP is 50% between the full BWP and the lowest supported BWP.

10. The system of claim 7, wherein the first threshold is 70% of a maximum capacity of a battery of the wireless device.

11. The system of claim 7, the operations further comprising: assigning the smallest supported BWP to the PCell while the remaining battery life remains below the third threshold.

12. A method of managing bandwidth allocation, the method comprising:

monitoring a remaining battery life of a wireless device;

assigning a full Bandwidth Part (BWP) to a Primary Cell (PCell) and one or more Secondary Cells (SCells) while the remaining battery life remains at or above a first threshold;

assigning the full BWP to the PCell and a smallest supported BWP to the one or more SCells while the remaining battery life remains below the first threshold and at or above a second threshold;

assigning an intermediate BWP for the PCell and the one or more SCells while the remaining battery life remains below the second threshold and at or above a third threshold; and upon determining that the remaining battery life is at or above a third threshold and below the second threshold, assigning an intermediate BWP for the PCell and the one or more SCells, wherein the intermediate BWP is between the full BWP and the lowest supported BWP.

13. The method of claim 12, wherein the monitoring the remaining battery life of the wireless device comprises querying the remaining battery life from a measurement report generated on the wireless device.

14. The method of claim 13, wherein the measurement report only includes the remaining battery life periodically.

15. The method of claim 14, wherein periodically comprises every 10th measurement report.

16. The method of claim 14, wherein periodically comprises every 1 minute.

17. The method of claim 12, wherein the intermediate BWP is 50% between the full BWP and a lowest supported BWP.

18. The method of claim 12, wherein the third threshold is 30% of a maximum capacity of a battery of the wireless device.

19. The method of claim 12, further comprising assigning the smallest supported BWP to the PCell while the remaining battery life remains below the third threshold.

* * * * *